O. ZARTH.
VEHICLE WHEEL.
APPLICATION FILED JULY 22, 1911.
1,043,283.
Patented Nov. 5, 1912.
2 SHEETS—SHEET 1.
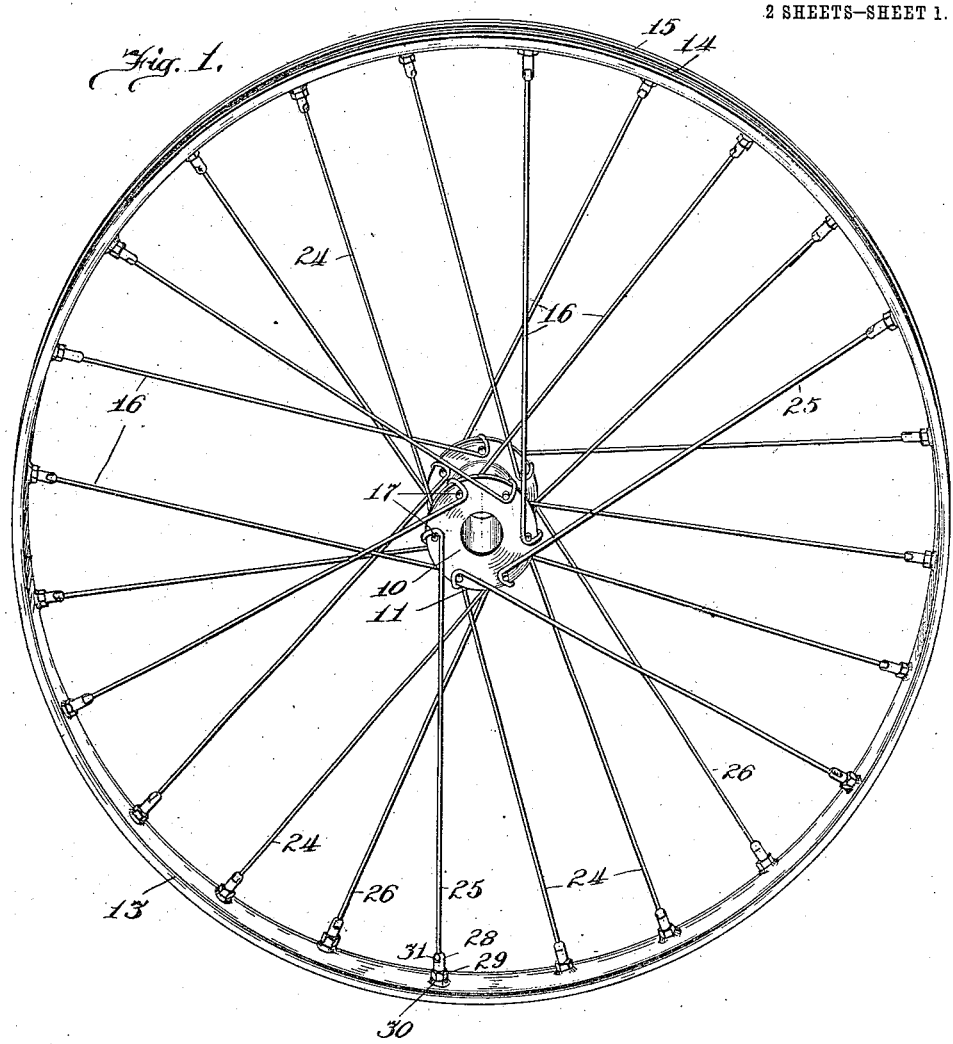
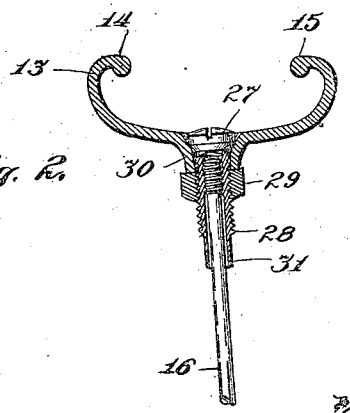
Witnesses
Inventor
Otto Zarth
Attorneys

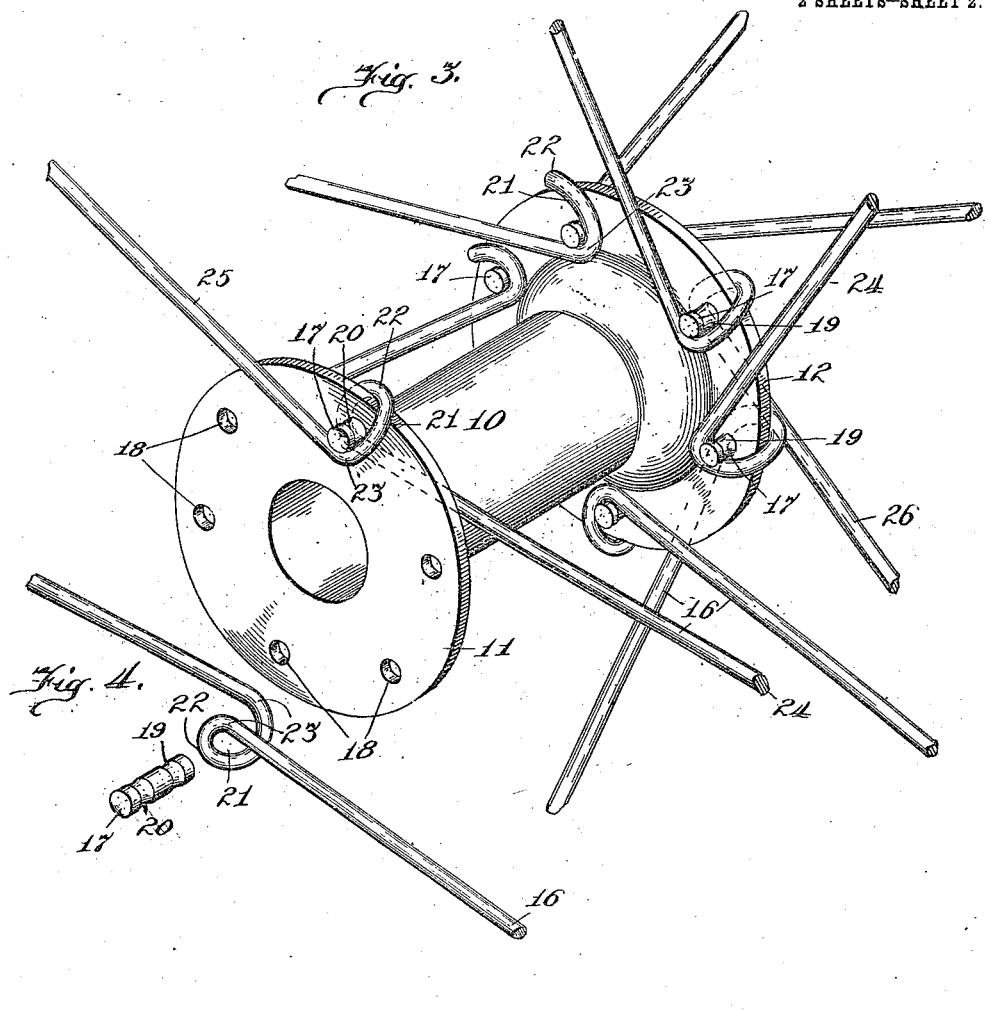
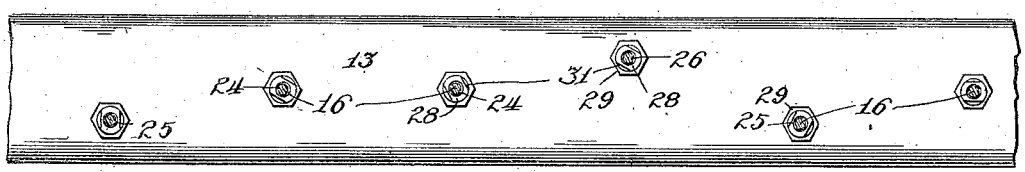

UNITED STATES PATENT OFFICE.

OTTO ZARTH, OF AURORA, ILLINOIS.

VEHICLE-WHEEL.

1,043,283.

Specification of Letters Patent.

Patented Nov. 5, 1912.

Application filed July 22, 1911. Serial No. 640,003.

*To all whom it may concern:*

Be it known that I, OTTO ZARTH, a citizen of the United States, and resident of Aurora, county of Kane, and State of Illinois, have invented certain new and useful Improvements in Vehicle-Wheels, of which the following is a specification, and which are illustrated in the accompanying drawings, forming a part thereof.

The invention relates to wheels of the suspension type, the spokes being rods and being drawn to a tension so that the load is carried from above.

The objects of the invention are to generally improve upon the construction of the wheel; to provide an improved form of double spoke; to improve upon the arrangement of the spokes with reference to the rim whereby the lateral strength of the wheel is increased; and provide an improved form of attachment of the spokes to the wheel rim. These objects are attained in the structure hereinafter described and illustrated in the accompanying drawings in which—

Figure 1 is a view in perspective of the completed wheel, Fig. 2 is a detail section through the rim of the wheel showing the means for attaching the spokes thereto, Fig. 3 is a detail in perspective of the hub of the wheel showing some of the spokes attached thereto, Fig. 4 is a detail of the central portion of one of the double spokes partially completed and showing also one of the pins by means of which the spokes are attached to the hub, and Fig. 5 is a detail elevation of the inner face of the wheel rim, the spokes being shown in section.

The hub 10 is provided at each end with a radial flange 11, 12. The rim of the wheel is shown at 13 and is preferably of metal, being represented as having inturned flanges 14, 15 at its edges for the purpose of holding a rubber tire. The spokes, as 16, are formed of wire or rods and are made double, that is to say, two spokes are formed of a single piece both ends of which are anchored in the rim of the wheel, the rod being attached midway of its ends to one of the flanges of the hub. This attachment is by means of pins, as 17, set through apertures, as 18, in the hub flanges, the pins thus being parallel with the axis of the hub. Each pin is circumferentially grooved as shown at 19, 20, adjacent its ends for the purpose of more securely holding the spoke. In securing the spoke to the hub it is first twisted to form a loop 21 to receive one end of the pin 17. One end of it, as 22, is then folded across the rim of the hub flange and carried under the opposite end of the pin, as shown at 23 in Fig. 3. The spokes are secured to the rim in three series, one series being along the circumferential median line of the rim and the other two being adjacent respectively, its inner and outer edges. That portion, as 24, of each spoke leading from the inner face of either of the flanges leads to the median line of the rim as indicated in Fig. 5; That portion, as 25, of each spoke leading from the outer face of the inner hub flange 11 is attached to the rim adjacent its inner edge and that portion, as 26, of each spoke which leads from the outer face of the outer hub flange 12 is attached to the rim adjacent its outer edge. By this arrangement, if each half of each rod is considered as a spoke it will be seen that the number of spokes attached to the rim along its median line is double that of each of the other series. The wheel is thus not only given great vertical strength but is very strongly braced laterally.

The spokes are secured to the rim by means of headed nipples which set through suitable apertures in the rim and are internally threaded to engage the end of the spoke and are externally threaded, as shown at 28, to carry a lock nut 29 which is turned up against the inner face of the rim, or preferably against the end of an inwardly projecting nipple 30. The head of the nipple 27 is preferably slotted for engagement by a screw driver and its inner end may be flattened, as indicated at 31, for engagement by a wrench. The nut 29 together with the head of the nipple 27 securely locks the spoke against sliding movement through the rim and also acts as a jam nut to prevent the nipple 27 from becoming loosened.

The wheel as described is very easily assembled. The pins 17 may be simply pressed into the apertures 18 so that when repairs become necessary they may be easily driven out with a hammer. The spokes when placed under tension firmly grip the pins 17 and the edge of the hub flange so that chafing is prevented. Moreover, the strength of the wheel is increased both by the manner of attaching the spokes to the hub and by their engagement with reference to the rim.

I claim as my invention—

1. In a wheel, in combination, a rim, a hub having a circumferential flange, studs projecting from both faces of the flange, and wire spokes having their ends secured to the rim and being looped over oppositely 5 projecting studs and across the rim of the flange.

2. In a wheel, in combination, a rim, a hub having a plurality of circumferential flanges, each flange having studs projecting 10 from both of its faces, and wire spokes having their ends secured to the rim and each being looped over oppositely projecting studs of one of the hub flanges and across the rim of the flange, the spokes being associated with the two flanges in alternation.

3. In a wheel, in combination, a rim, a hub having a plurality of circumferential flanges, each flange having studs projecting from both of its faces, and wire spokes having their ends secured to the rim and each 20 being looped over oppositely projecting studs of one of the hub flanges and across the rim of the flange, the spokes being associated with the two flanges in alternation, opposite ends of each spoke being attached 25 to the rim on different circumferential planes.

OTTO ZARTH.

Witnesses:
HORACE R. BURNS,
EDWARD SCHMIDT.

Copies of this patent may be obtained for five cents each, by addressing the "Commissioner of Patents, Washington, D. C."